United States Patent
Tanaka et al.

[11] Patent Number: 5,887,686
[45] Date of Patent: Mar. 30, 1999

[54] DRUM BRAKE HAVING A VIBRATION SUPPRESSION SYTEM

[75] Inventors: Shinichi Tanaka, Hino; Shigeru Tanaka, Tsuki-gun; Teizo Shimomura, Hamura, all of Japan

[73] Assignee: Hino Jidosha Kogyo Kabushiki Kaisha, Tokyo, Japan

[21] Appl. No.: 632,080

[22] Filed: Apr. 15, 1996

Related U.S. Application Data

[63] Continuation of PCT/JP95/01744, Sep. 1, 1995.

[30] Foreign Application Priority Data

| Sep. 2, 1994 | [JP] | Japan | 6-210204 |
| Nov. 2, 1994 | [JP] | Japan | 6-269766 |
| Nov. 2, 1994 | [JP] | Japan | 6-269791 |
| Nov. 2, 1994 | [JP] | Japan | 6-269816 |

[51] Int. Cl.⁶ ............................................. F16D 65/08
[52] U.S. Cl. ............................... 188/250 E; 188/73.37
[58] Field of Search ........................ 188/250 E, 73.35, 188/73.36, 73.37

[56] References Cited

U.S. PATENT DOCUMENTS 5,515,452  5/1996  Jackson ........................... 188/250 E

FOREIGN PATENT DOCUMENTS

| 8156734 | 9/1983 | Japan | 188/73.37 |
| 59-100120 | 7/1984 | Japan . | |
| 0200819 | 11/1984 | Japan | 188/73.35 |
| 1-65944 | 4/1989 | Japan . | |
| 3-84436 | 8/1991 | Japan . | |
| 3-288028 | 12/1991 | Japan . | |

*Primary Examiner*—Matthew C. Graham
*Attorney, Agent, or Firm*—Cushman Darby & Cushman IP Group of Pillsbury Madison & Sutro LLP

[57] ABSTRACT

A device for suppressing brake noise wherein a rod is provided upright on the inside of the rim to which the brake lining is fitted, and a weight is fitted to this rod by way of an elastic body. By fitting a weight to the brake shoe by way of an intermediary elastic body, the weight will vibrate when it is subject to the vibration of the brake shoe. At low frequencies the vibration of the weight will be in phase with the vibration of the brake shoe, but as the vibration frequency of the brake shoe increases, the vibration of the weight will shift out of phase with the vibration of the brake shoe. In the vicinity of and above a certain frequency, this phase difference will become nearly 180 degrees. By matching this frequency to the brake noise frequency, the vibration of the brake shoe can be suppressed by the vibration of the weight.

6 Claims, 21 Drawing Sheets

DRUM BRAKE HAVING A VIBRATION SUPPRESSION SYTEM

This is a continuation of PCT/JP95/01744 filed Sep. 1, 1995.

BACKGROUND OF THE INVENTION

1. Field of the Invention

This invention is utilized for motor vehicle brakes, and for drum brakes in particular. It relates to a technique for reducing the so-called "brake noise" emitted when a motor vehicle brakes.

2. Description of Related Art

Much research has been carried out with the aim of reducing brake noise (the unpleasant "squeal" noise) produced when a motor vehicle brakes, and many proposals have been made regarding its reduction. The present applicant has been making a close study of this problem for a long time.

The technique disclosed in Jap. Unexamined Pat. No. 3-288028 is a prior application by the present applicant and involves fitting a pressure member to the inside of the rim of the brake shoe by way of an intermediary friction member. The technique disclosed in Jap. Unexamined Pat. No. 1-65944 is an older technique which is equivalent to the prior application of the present applicant, and involves fitting a friction member to the inside of the rim.

The technique disclosed in Jap. Unexamined Utility Model No.3-84436 likewise pertains to the prior application of the present applicant, and involves suppressing brake shoe vibration by fitting a weight to the inside of the rim. At the time at which this technique was disclosed, the idea of interposing an elastic member between the weight and the rim had not been thought of.

Subsequent experimental studies have confirmed the correctness of the analysis and explanation of brake noise given in the aforementioned Jap. Unexamined Pat. No.3-288028, and in particular the phenomenon explained with reference to FIG. 8 of the same publication. (This phenomenon will be explained in connection with the embodiments disclosed in the present application.) Namely, it has been found that the main cause of brake noise is vibration of the brake shoe, and that a brake shoe will vibrate in a radial direction as shown by the dotted lines in FIG. 27 of the application.

Brake noise is reduced by the aforementioned technique, and in the particular case of small passenger cars travelling on ordinary urban roads, it has been reduced to the level under which for practical purposes it is hardly a problem at all. However, under some conditions (and what these conditions are is not clear) the phenomenon of brake noise still occurs in the case of heavy duty vehicles, and further research is required to overcome this problem.

The present inventors have observed the phenomena associated with brake noise and have analyzed the results of these observations in a variety of ways. They have carried out experiments and analysis on vibration and have studied concrete measures for suppressing brake shoe vibration. The aforementioned experimental and analyses have involved new investigative methods, such as displaying vibration on a computer screen in an exaggerated form and correlating it with the frequency characteristics of the sound it produces. As the outcome of these studies, the present inventors propose the technique disclosed in this application. The experiments which they have performed have proven that this technique is far more useful than the previously known measures.

SUMMARY OF THE INVENTION

The following are objects of the present invention: to reduce brake noise; to provide a technique capable of reducing brake noise in application to brake shoes of various sizes, the reduction being achieved in an optimally effective way and not simply by means of an empirical fix; to enable brake noise of large vehicles with large brake shoes to be sufficiently reduced for practical purposes; to provide a brake noise reduction technique the performance of which remains constant when the brake lining is replaced; and to enable brake noise to be reduced by means of inexpensive additional parts. Further objects of this invention are: to improve reliability by suppressing deterioration of an elastic body and an adhesive, and by suppressing loss of vibration damping performance of an elastic body; and to provide a vibration damping device which can effectively preserve the additional parts even in environments exposed to high temperatures and severe vibration.

The present invention is characterised in that it effectively reduces brake noise emitted when a motor vehicle brakes, by fitting a weight to an oscillating member by way of an intermediary elastic body. The oscillating member may, for example, be the brake shoe which is the source of the brake noise, or it may be the brake drum or back plate which resonate with the brake noise and thereby transmit noise to the environment. Fitting the weight to the wheel cylinder is also possible.

An important distinguishing feature of this invention is not simply that a weight is fitted, but that a weight is fitted by way of an intermediary elastic body. Fitting the weight by way of an intermediary elastic body expands the free oscillation domain of the weight and results in a natural vibration frequency being observed for the weight in accordance with the properties of the elastic body. The vibration of the oscillating member is transmitted to the weight, and when this happens in the low frequency domain, the oscillating member and the weight vibrate together in-phase. However, the following phenomenon is observed: namely, the vibrations of the oscillating member and the weight gradually to shift out of phase as the frequency of the vibration increases. At or above a certain frequency, the phase difference between the vibration of the oscillating member and the vibration of the weight become opposite. The vibration of the oscillating member and the vibration of the weight becoming opposite in phase means that the vibration energy is converted to heat energy due to the elastic body deformation, with the result that the vibration of the oscillating member is suppressed. This is the principle of the present invention.

A first aspect of this invention is a brake shoe characterized in that a weight is fitted, by way of an intermediary elastic body, to the rim to which the brake lining has been fitted. In other words, an important distinguishing feature is not that a weight is fitted directly to the member where vibration originates, but that the weight is fitted by way of an intermediary elastic body. In greater detail, by fitting the weight by way of an intermediary elastic body, vibration and noise with a frequency in the vicinity of or higher than the natural vibration frequency, which is determined by the properties of the elastic body and by the weight, can be effectively suppressed. It has been confirmed experimentally that this suppression is not restricted to frequencies higher than the natural vibration frequency, and that vibrations with frequencies in the vicinity of and lower than the natural vibration frequency are also suppressed on the basis of the phase relation between the brake shoe vibration and the vibration of the weight.

The aforementioned weight may be fitted directly to the rim by way of the elastic body, or a rod may be provided upright on the rim and the aforementioned weight fitted to this rod by way of the aforementioned elastic body. The location at which the aforementioned weight is fitted is preferably the inside of the rim, the side of the web, or the top of the web. Here, "rod" broadly signifies a rod-shaped member, and parts generally called "pins" are included under this term "rod".

The elastic body may be formed ring-shaped, and the aforementioned rod may pass through the center of this elastic body. Metal may be used for the rod, and the ring-shaped weight may be provided so as to encircle the aforementioned elastic body. The rod may be cylindrical in shape. Here, "ring-shaped" includes bodies where the cross section perpendicular to the axis is polygonal, as well as bodies where this cross section is circular.

A support may be fitted to the rod and, a space provided between this support and the rod. The elastic body maybe provided so as to encircle this support and a ring-shaped weight provided so as to encircle this elastic body. This construction has the advantage that heat is dissipated from the space between the support and the rod. In addition, heat generated in the brake lining can be prevented from being directly transmitted by forming beforehand a concavity in the vicinity of the location where the weight is fitted, the concavity being formed where the brake lining joins the rim.

When a weight is fitted by way of an intermediary elastic body to the inside of the rim or the side of the web, a cover can be placed over it, so that even if wear powder is generated accompanying braking, this wear powder can be prevented from accumulating around the elastic body and the weight.

By analyzing data obtained from actual measurements, the present inventors have succeeded in formulating mathematical expressions for the range over which the proposed technique is effective, and they have confirmed that within this range an extremely effective countermeasure is obtained. These mathematical expressions will be explained in detail below.

In a drum brake, braking is achieved by friction between the inner surface of the brake drum and the outer surface of the brake lining. As a result, the rim on which the brake lining is fixed and the web which supports this rim are raised to an elevated temperature by the heat generated during braking. An elastic body and a weight that have been fitted to the rim or the web will also be affected by this heat. Because the weight and the elastic body, and the elastic body and the web or rim, are fixed by gluing, the adhesive involved will likewise be affected by the heat.

This accelerates the deterioration of the elastic body and the adhesive. Moreover, an accumulation of wear powder generated from the brake lining during braking will also reduce the vibration damping performance of the elastic body. Although for practical purposes it is sufficient to simply fix the weight to the web or rim by way of the elastic body, it has been found that deterioration of the elastic body and the adhesive, and loss of vibration damping performance of the elastic body, can be suppressed by providing a rod to which the weight and the elastic body are fitted. It has been confirmed that reliability can be improved in this way.

A second aspect of this invention is a drum brake characterized in that a weight is fitted to its back plate by way of an elastic body. The elastic body and the weight can be fitted directly to the back plate, but in this second aspect, it is effective to provide an upright rod and to fit the weight to this rod by way of the intermediary elastic body. A practical construction that is also effective is to fix the weight by means of a bolt instead of a rod.

The aforementioned formulation of mathematical expressions will now be explained. These mathematical expressions apply to the case where the weight is fitted to the brake shoe, and to the case where it is fitted to the back plate.

Letting the mass of a weight be m and the spring constant of an elastic body that is set between the weight and an oscillating member (the brake shoe, the back plate, etc.) be k, then the natural vibration frequency of the weight fitted by way of the aforementioned elastic body will be given by:

$f_0=(1/(2\pi))\sqrt{(k/m)}$

Experimental studies have confirmed that it is effective to make this natural vibration frequency approximately equal to or less than the principal frequency component $f_s$ of the brake noise produced by the brake shoe. For example, by setting the following for the relation between brake noise frequency $f_s$ and natural vibration frequency $f_0$:

$f_s > 2f_0$ this technique will be effective over a wide range of brake noise frequencies $f_s$.

Conversely, in cases where the particular construction of the brake shoe results in brake noise frequency $f_s$ being almost a fixed frequency, it has been found that weight reduction can be achieved by the following design scheme: reducing the mass m of the weight so that the aforementioned natural vibration frequency $f_0$ is brought near to the brake noise frequency $f_s$.

In other words, it was found that vibration damping of a frequency $f_s$ will be effective if, in order to reduce the mass m of the weight, $f_0$ is regarded as being approximately equal to $f_s$. That is to say, it was found that if the shape of the rim is such that the brake noise frequency may be treated as being almost constant in value, it will be effective for $f_0$ to be approximately equal to or even just slightly larger than the brake noise frequency $f_s$ due to the brake shoe.

A third aspect of this invention is characterized in that a weight is fitted by way of an elastic body to the wheel cylinder of a drum brake. The wheel cylinder is the component which receives the braking pressure and transmits this to the brake shoes by way of a pair of internally housed pistons. The wheel cylinder itself is fitted on the inside of the back plate of the drum brake. The wheel cylinder is subject to brake shoe vibration produced during braking and transmits this vibration to the back plate, thereby constituting an element which increases the brake noise. Accordingly, it was verified experimentally that the vibration of the wheel cylinder can be suppressed by fitting a weight by way of an elastic body to its outside. It was also confirmed experimentally that the mathematical expressions given above apply to this case as well.

These mathematical expressions will now be explained again in qualitative terms. If an oscillating member (in this case, a brake shoe, the back plate of a drum brake, the wheel cylinder, etc.) vibrates, and if a weight has been fitted to this oscillating member by way of an intermediary elastic body, then at low frequencies this weight will oscillate in phase with the oscillating member. However, as the frequency increases, the vibration of the weight will gradually shift out of phase with the vibration of the oscillating member, and when a certain frequency is exceeded, the vibration of the weight will be opposite in phase; i.e., the phase difference will be 180 degrees. This means that vibration energy is being converted to heat energy due to the elastic body deforming, with the result that the vibration of the oscillating member is suppressed. In other words, in order to suppress vibration, it should be set to a frequency at which the vibration of the weight becomes opposite in phase, and to a frequency at which there is a pronounced generation of acoustic noise.

Instead of a single weight, a plurality of weights can be fitted to the inside of the aforementioned rim or to the aforementioned web, each such weight being fitted by way of an aforementioned elastic body. When there is a wide range of brake noise frequencies, it is effective if the respective natural vibration frequencies of this plural number of weights are made to differ slightly from one another. The spring constant of an elastic body is determined by the nature of the material from which it is made and by its shape. A heat-resisting rubber or other plastic material is convenient to use as the material for the elastic body, the shape of which is preferably set on a theoretical and experimental basis so as to satisfy the aforementioned equations.

The present inventors have performed repeated experiments setting a variety of conditions and have thereby confirmed empirically that brake noise emitted when a motor vehicle brakes can be effectively reduced. It has been confirmed time after time that if a weight of the sort described above is fitted by way of an elastic body to a brake shoe which generates noise, the noise is greatly reduced, and that it will occur again when the weight is removed.

Because the elastic body and the weight are inexpensive parts with a simple structure, the invention taught in this application enables brake noise to be sufficiently reduced for practical purposes without incurring great expense. Moreover, its performance does not change when the brake lining is replaced.

Speaking in more concrete terms, the frequency of brake noise is generally not a uniform frequency but rather a mixture of a plurality of frequencies, and according to measurements is made up largely of frequency components exceeding 1 kHz. In greater detail still, the frequency components in the range 1.4 kHz to 2 kHz constitute an unpleasant noise.

Accordingly, it is preferable to set the natural vibration frequency $f_0$ of the aforementioned weight fitted by way of an elastic body in the vicinity of 1 kHz, or to less than this. Experimental confirmation of this under a variety of different conditions has verified that setting the natural vibration frequency $f_0$ to about 500 Hz is effective for a wide range of frequencies, and that making the natural vibration frequency $f_0$ even lower and setting it to 100 Hz is effective for reducing noise with an even wider range of frequencies. Making this natural vibration frequency $f_0$ even lower might be considered, but in actuality, the mass of a weight increases as an elastic material becomes softer, and therefore, it is questionable whether this would be industrially effective, and whether a good elastic material could be obtained inexpensively.

On the other hand, since the rim is the member in which heat is generated by friction between the brake drum and the brake lining, the material selected for the elastic body also has to have adequate heat resistance and durability. Given this requirement, the selection of an extremely small value for the natural vibration frequency $f_0$ is problematic. The experiments herein reported were performed using synthetic rubbers (or plastic materials) with various moduli of elasticity as the elastic material, and a metal material (specifically, lead) as the weight.

These studies indicate that it is possible to select a suitable synthetic rubber (or plastic material) which also has excellent heat resistance; and that it is industrially superior to set the natural vibration frequency $f_0$ to around 100 Hz, or slightly higher to about 200 Hz, by giving the weight a mass of the order of several hundred grams, which is convenient for practical purposes.

DETAILED DESCRIPTION OF THE PREFERRED EMBODIMENTS

Embodiments of this invention will now be explained on the basis of the drawings.

(First embodiment)

Figure 1:
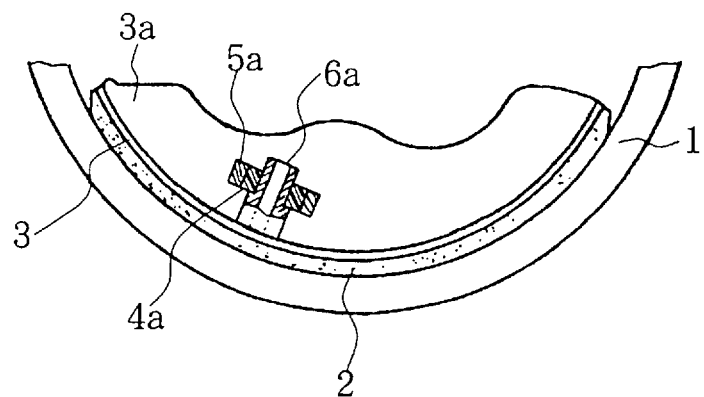
FIG. 1 is a partial side view showing the configuration of a first embodiment of this invention.
Figure 2:
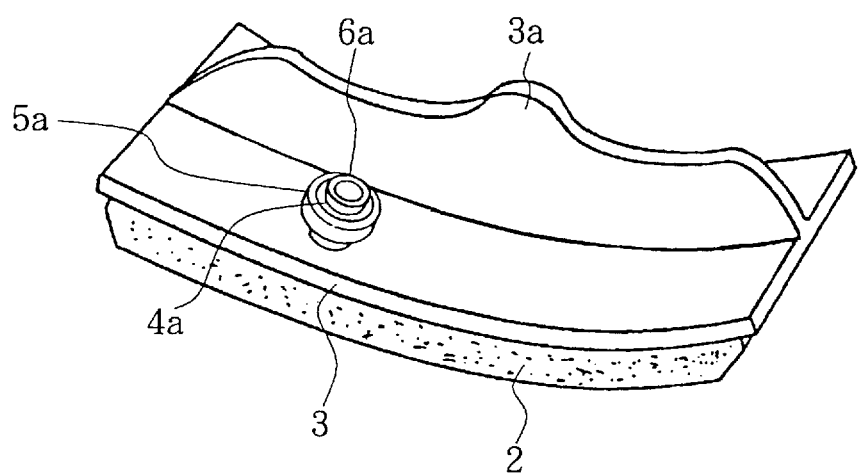
FIG. 2 is a perspective view showing the configuration of a first embodiment of this invention.

FIG. 1 is a partially side view showing the configuration of a first embodiment of this invention, and FIG. 2 is a perspective view of the same.

According to this first embodiment of the invention, hollow cylindrical rod 6a is provided upright on the inside of rim 3 of web 3a to which brake lining 2 has been fitted, the brake lining 2 being pressed against brake drum 1 and generating a braking force due to frictional resistance; and weight 5a is fitted to this rod 6a by way of ring-shaped elastic body 4a. Letting the mass of weight 5a be m and the spring constant of elastic body 4a be k, the natural vibration frequency of weight 5a fitted by way of elastic body 4a will be given by:

$f_0 = (1/(2\pi))\sqrt{(k/m)}$ and is set so as to be lower than the brake noise frequency $f_s$ produced by brake lining 2.

Explanations will now be given of the results of tests on a first embodiment of this invention constituted in this manner.

(Test 1-1)

First of all, the results of measurements of brake noise from a medium-sized bus will be explained.

Figure 3:
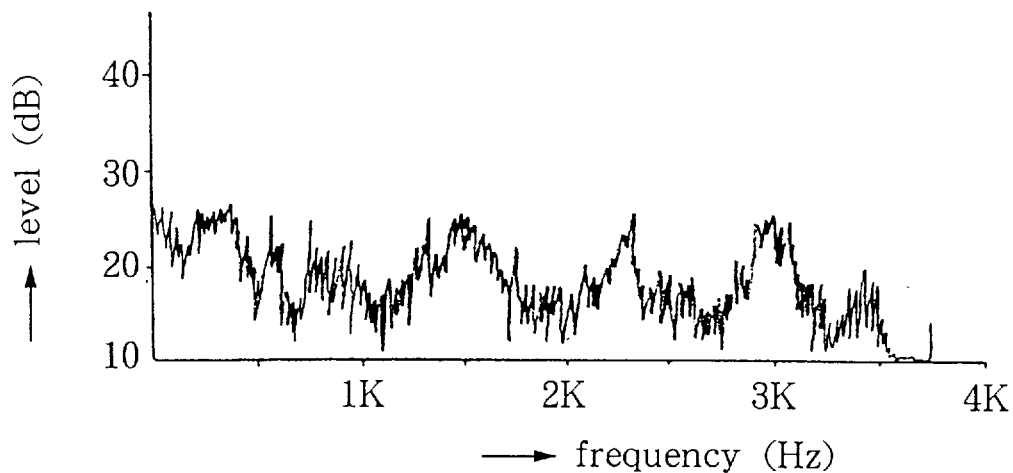
FIGS. 3(a) and (b) show measured values of vibration frequency and braking noise level during braking in the first embodiment of this invention and in a prior art example, respectively.
Figure 3:
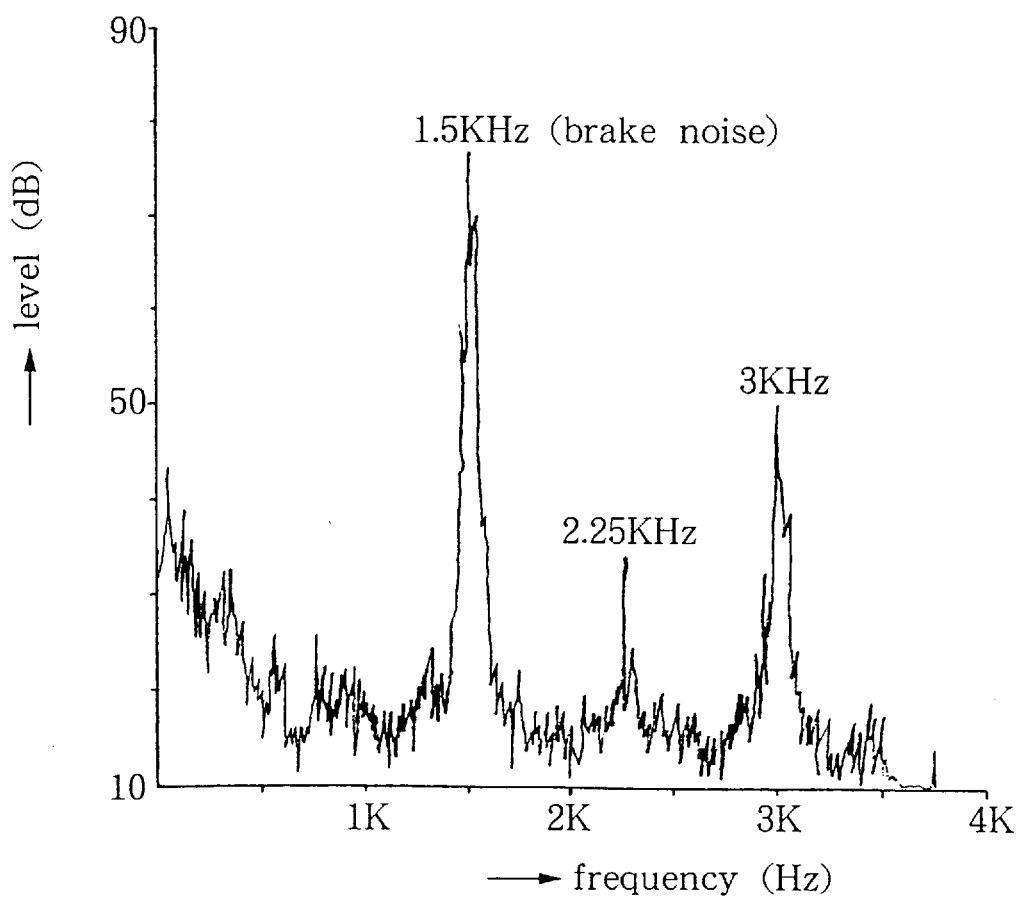

FIG. 3(a) and FIG. 3(b) were obtained by placing a microphone in the vicinity of a brake of the vehicle under test, converting the sound generated by the brake to an electric signal, amplifying this electric signal using a wideband acoustic signal amplifier, and analysing its frequency components with a spectrum analyzer. Frequency is plotted along the horizontal axis and the vertical axis shows the sound level in dB, which is a relative measure of sound intensity. FIG. 3(a) gives the results of measurements made on a brake which implemented this invention, while FIG. 3(b) is a comparison. The results given in this comparison were obtained by making the same measurements in respect of the same brake unit of the same vehicle, the difference simply being that the essential elements of this invention, i.e., the weight and the elastic body, were removed. These are the results of running tests on a medium-sized bus, and no simulated elements whatsoever were included in the tests.

Figure 4:
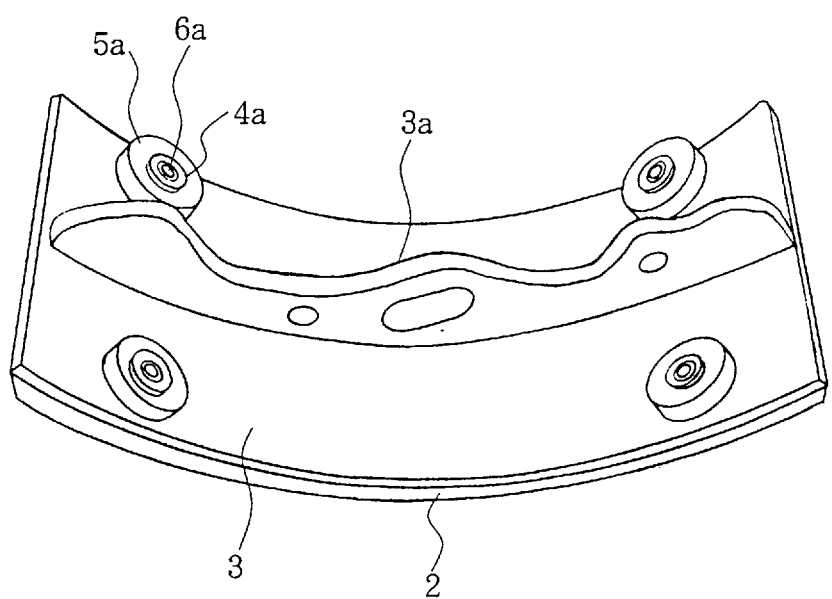
FIG. 4 is a perspective view showing the external appearance of a test piece according to the first embodiment of this invention.

As will be seen in FIG. 3(b), brake noise with its sound energy concentrated in three peaks: namely, a high peak in the vicinity of a frequency of about 1.5 kHz, a small peak at 2.25 kHz, and a medium-sized peak at 3 kHz, was generated from a rear wheel brake during a running test of the medium-sized bus. A test was then carried out in which, to counteract this brake noise, four weights were fitted to rim 3 by way of elastic bodies, as shown in FIG. 4 (i.e., eight weights were fitted per wheel). As a result, as shown in FIG. 3(a), brake noise exhibiting high peaks was eliminated, with the brake noise level being under 30 dB over the full measurement range up to 4 kHz. This is the general noise level and therefore gives a listener the impression that the brake noise has disappeared.

(Test 1-2)

A test of vibration damping characteristics was also carried out before and after fitting of weights in accordance with embodiments of this invention. This test involved using a brake unit of a medium-sized bus, applying to the wheel cylinder the pressure applied (30 kg/cm$^2$) during ordinary braking (in terms of deceleration, approximately 2 m/s$^2$ or 0.2 g), hitting the brake drum with a hammer with a fixed force, and measuring the resulting vibration. Results of this test are given in FIGS. 5(a) and (b), in which the horizontal axis is the time axis and the vertical axis shows the amplitude of the acoustic vibration.

Figure 5:
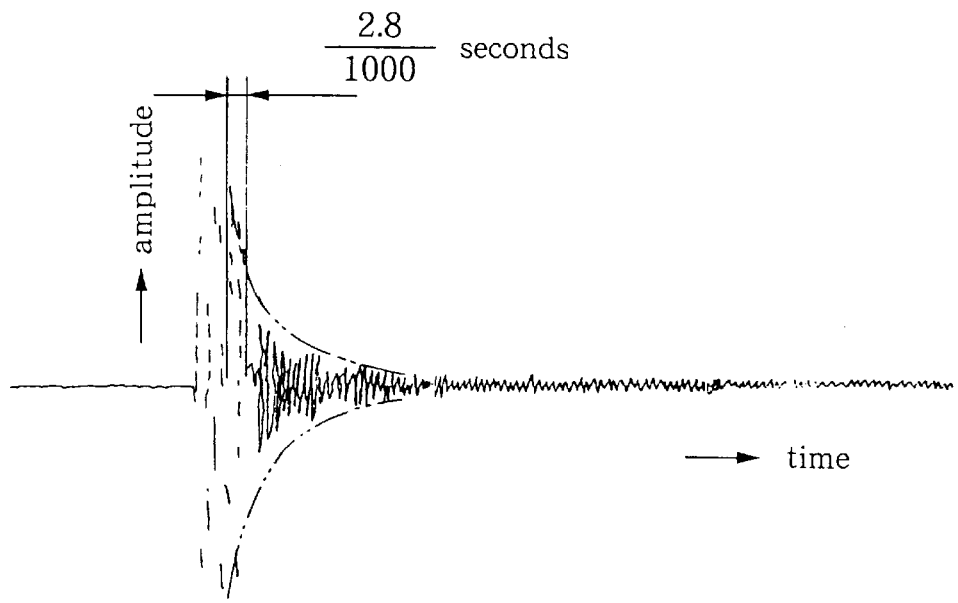
FIGS. 5(a) and (b) show the results of vibration damping tests of the first embodiment of this invention and of a prior art example, respectively.
Figure 5:
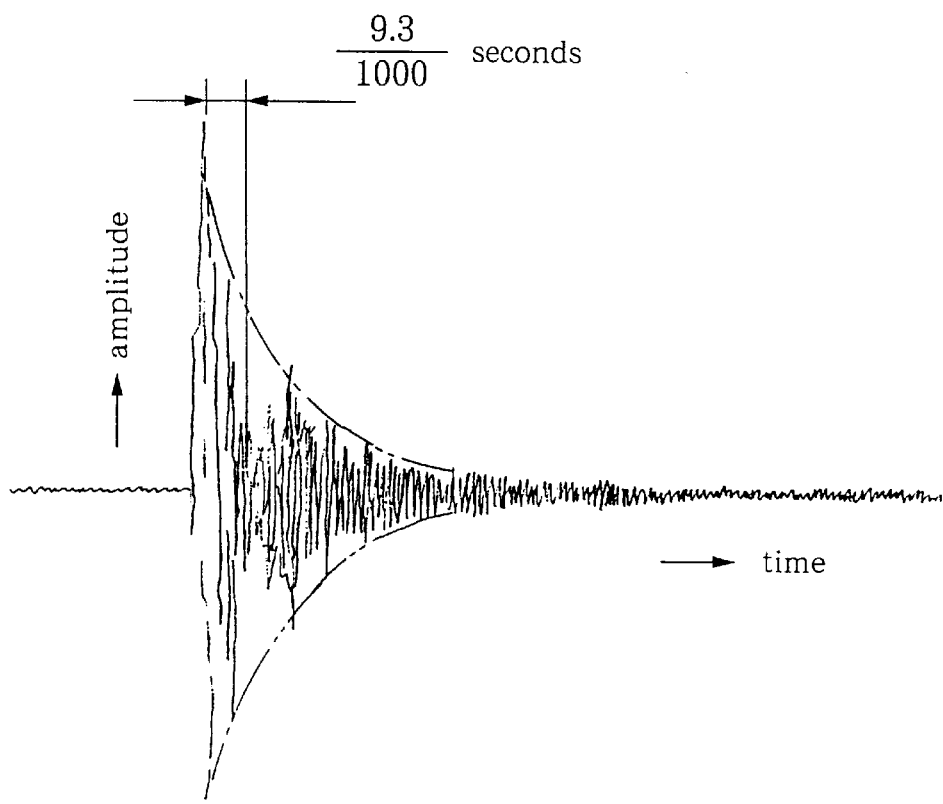

FIG. 5(a) gives the vibration damping characteristics when weights embodying this invention were fitted as shown in FIG. 4. FIG. 5(b) is a comparison obtained by making measurements using the same brake unit, but with the weights and elastic 5(a) and (b) both show the waveform observed on an oscilloscope when the acoustic vibration was converted to an electric signal by a pickup and this electric signal amplified by a wideband amplifier. Time is plotted along the horizontal axis and vibration amplitude shown along the vertical axis. These results show that acoustic vibration can be greatly reduced by implementing this invention.

(Test 1-3)

An explanation will now be given of a deterioration test of a practical device according to this invention.

A heat deterioration test was carried out on the first embodiment of this invention (see FIG. 1). This involved fitting the embodiment to an actual vehicle, running this vehicle along a standard road used for thermal evaluation (equivalent to a typically steep hill road in Japan), measuring the temperature of the brake shoes, and then setting the conditions of an accelerated deterioration test on the basis of the observed changes in brake shoe temperature. A brake shoe according to an embodiment of this invention was then placed in a thermostatic chamber and, on the basis of the aforementioned conditions, subjected to repeated temperature cycles to produce accelerated deterioration. The vibration damping test was then performed.

Figure 6:
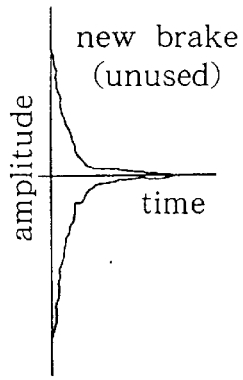
FIG. 6(a) shows vibration damping prior to a heat deterioration test in the case of the first embodiment of this invention.
FIGS. 6(b)–(h) show vibration damping after a heat deterioration test in the case of the first embodiment of this invention.
FIG. 6(i) shows vibration damping in the case of a prior art example.
Figure 6:
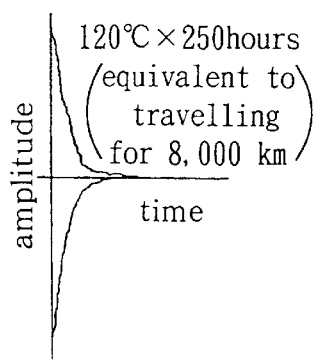
Figure 6:
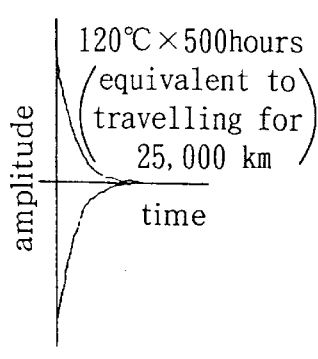
Figure 6:
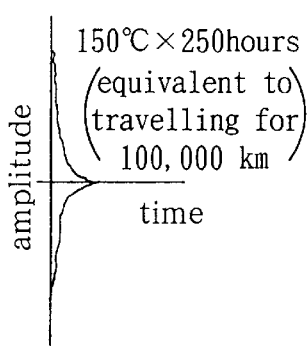
Figure 6:
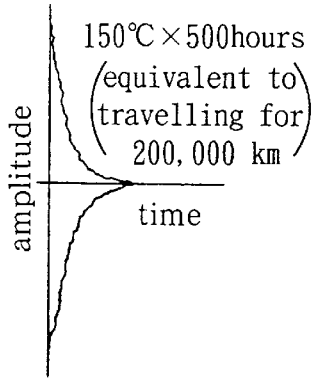
Figure 6:
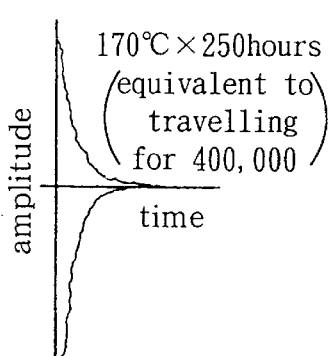
Figure 6:
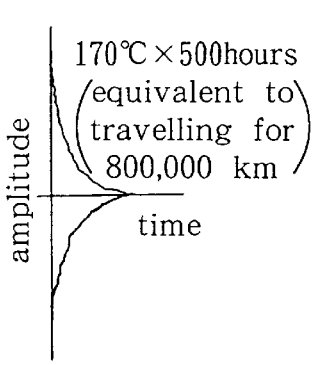
Figure 6:
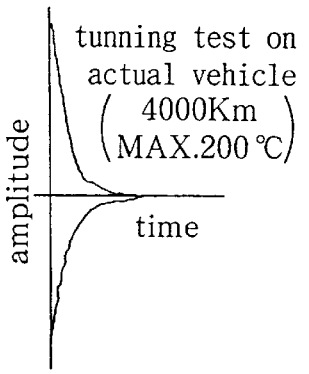
Figure 6:
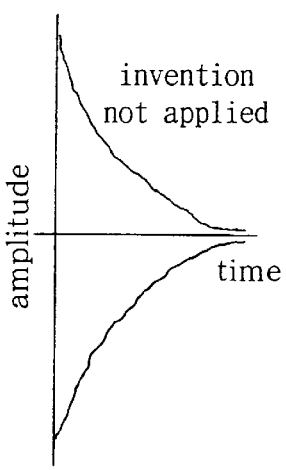

FIG. 6 shows the results of this latter test. FIG. 6(a) gives the results in the case of a new brake prior to heat deterioration, while FIGS. 6(b)–(g) respectively show the results after heat deterioration equivalent to 8,000 km to 800,000 km. FIG. 6(h) gives the results obtained when a configuration according to this invention was mounted on an actual vehicle which was then run for 4000 km (reaching a maximum temperature of 200° C.). FIG. 6(i) is a comparison and shows the test results when this invention was not applied, i.e., when the weights and elastic bodies had been removed. It will be seen from these results that a configuration according to this invention can be guaranteed to have a service life on a par with that of the vehicle itself, and that the vibration damping characteristics after passage of time are nearly the same as those of a new brake.

Next, the nature of the vibration of this first embodiment of the invention will be explained.

Figure 7:
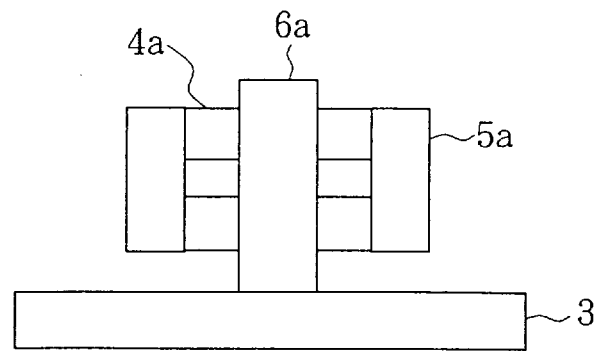
FIG. 7(a) shows schematically the construction of the first embodiment of this invention.
FIG. 7(b) shows schematically the situation when this construction is subject to vibration.
Figure 7:
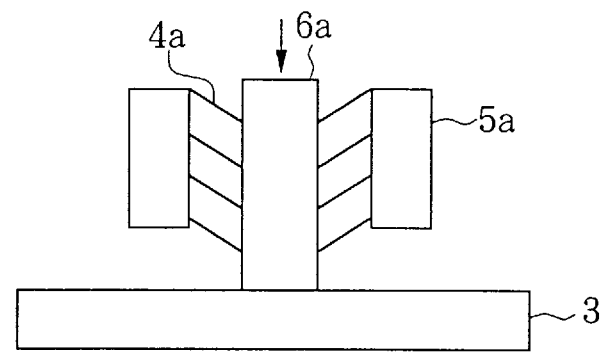
Figure 8:
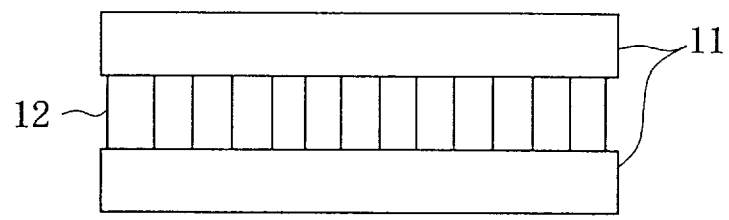
FIG. 8(a) shows schematically another type of construction for damping vibration energy.
FIG. 8(b) shows schematically the situation when this other construction is subject to vibration.
Figure 8:
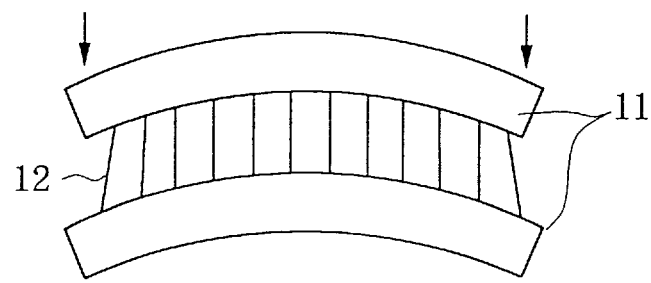

FIG. 7 shows schematically the structure for damping vibration energy according to the first embodiment of this invention, while FIG. 8 shows schematically a previously known vibration energy damping structure that uses steel plates. FIG. 7(a) and FIG. 8(a) show the state of the structures before they are subject to vibration, while FIG. 7(b) and FIG. 8(b) show the state when they have been subject to vibration. The structure of the first embodiment of this invention shown in FIG. 7 involves rod 6a being provided upright on the inside of rim 3, and weight 5a being fitted on this rod 6a by way of elastic body 4a. Accordingly, vibration generated in rim 3 by braking is transmitted to rod 6a, whereupon, as shown in FIG. 7(b), weight 5a undergoes large displacements in a vertical direction by way of elastic body 4a, with the result that the vibration energy is dissipated in the form of heat energy. With a structure that uses steel plates as shown in FIG. 8, elastic body 12 is positioned between two steel plates 11, whereupon steel plates 11 deform as shown in FIG. 8(b) when subject to vibration, with the result that the vibration energy is converted to heat energy. Comparing this with the structure of the first embodiment of this invention, it will be seen that the deformation of elastic body 4a is greater than the deformation of elastic body 12, with the result that the damping of vibration energy is performed more efficiently.

(Second embodiment)

Figure 9:
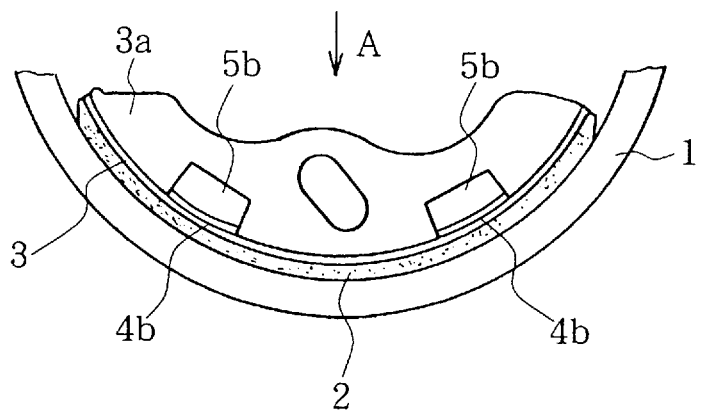
FIG. 9 is a partial side view showing the situation where elastic bodies and weights have been fitted to the inside of the rim in a second embodiment of this invention.
Figure 10:
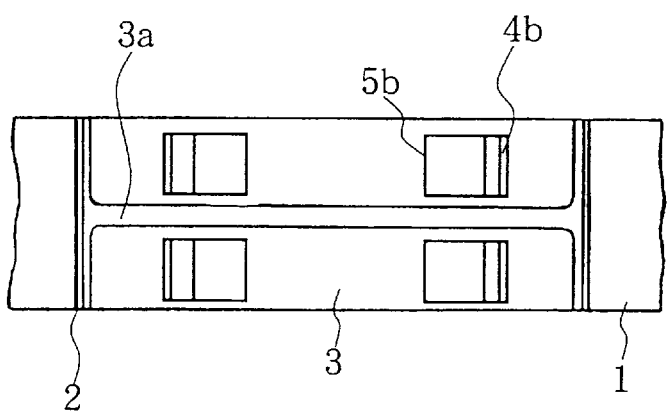
FIG. 10 is the view looking in the direction of arrow A in FIG. 9 in this second embodiment of the invention.
Figure 11:
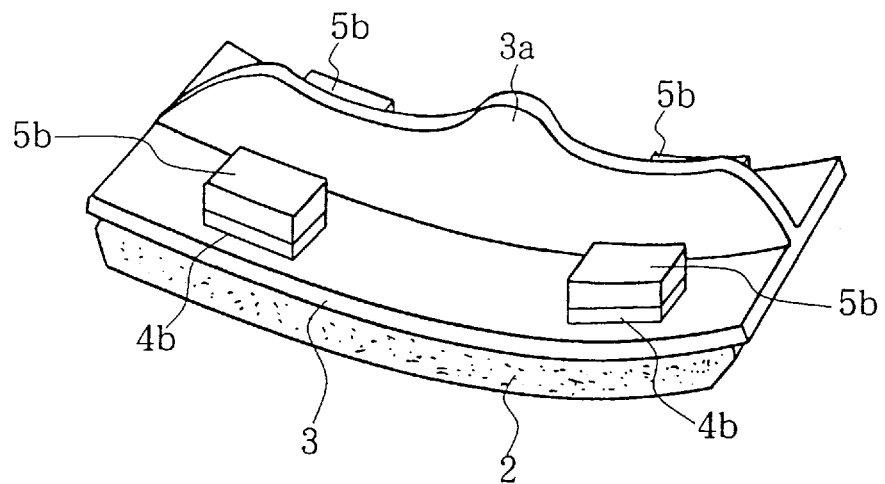
FIG. 11 is a perspective view showing the situation where elastic bodies and weights have been fitted to the inside of the rim in this second embodiment of the invention.

FIG. 9 is a partial side view showing elastic bodies and weights fitted to the inside of the rim in a second embodiment of this invention. FIG. 10 is a view of this second embodiment of the invention, looking in the direction of arrow A shown in FIG. 9. FIG. 11 is a perspective view of this second embodiment.

Structurally, this second embodiment of the invention comprises a plurality of weights 5b fitted by means of adhesion and by way of respective elastic bodies 4b to the inside of rim 3, to which brake lining 2 is fitted, the brake lining 2 being pressed against brake drum 1 and generating a braking force due to frictional resistance. Letting the mass of a weight 5b be m and the spring constant of an elastic body 4b be k, the natural vibration frequency of weight 5b fitted by way of elastic body 4b will be given by:

$f_0 = (1/(2\pi))\sqrt{(k/m)}$ and is set so as to be lower than the brake noise frequency $f_s$ produced by brake lining 2.

Next, explanations will be given of the results of tests on a second embodiment of this invention constituted in this manner.

(Test 2-1)

Figure 12:
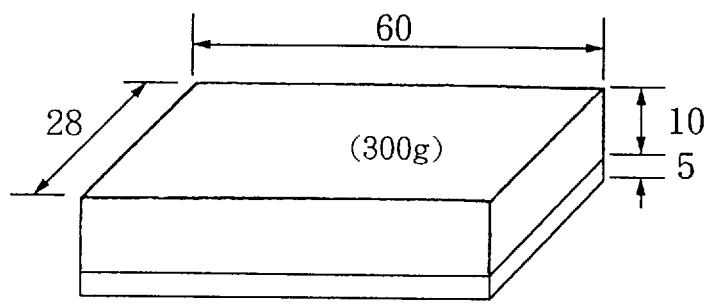
FIGS. 12(a) and (b) are perspective views showing the external appearance and shape of "samples" according to this second embodiment of the invention.
Figure 12:
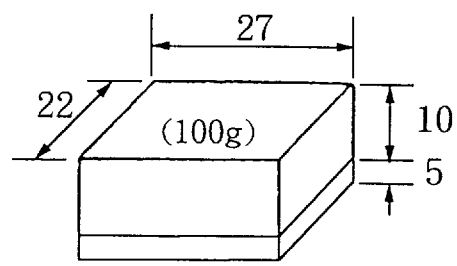

FIGS. 12(a) and 12(b) show the shapes of weights 5b and elastic bodies 4b used in this test. The combination of a weight 5b and an elastic body 4b will here be termed a "sample". FIG. 12(a) shows the structure of sample 1, while FIG. 12(b) shows the structure of sample 2. Lead was used throughout as the material for the weights, and nitrile rubber with a hardness of 60 was used for the elastic bodies. Sample 1 was larger, comprising a 60 mm×28 mm×10 mm weight with a mass of 300 g, and a 60 mm×28 mm×5 mm elastic body. Sample 2 was smaller, comprising a 27 mm×22 mm×10 mm weight with a mass of 100 g, and a 27 mm×22 mm×5 mm elastic body. A large number of these samples 1 and 2 were prepared.

Figure 13:
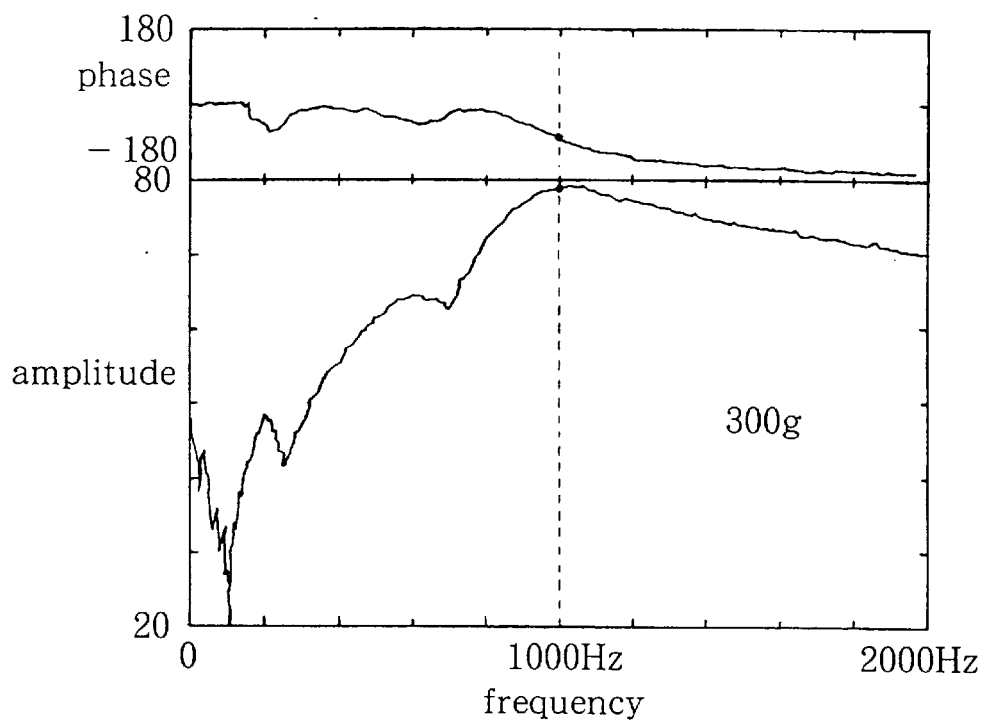
FIGS. 13(a) and (b) show the results of hammer blow tests in the case of this second embodiment of the invention.
Figure 13:
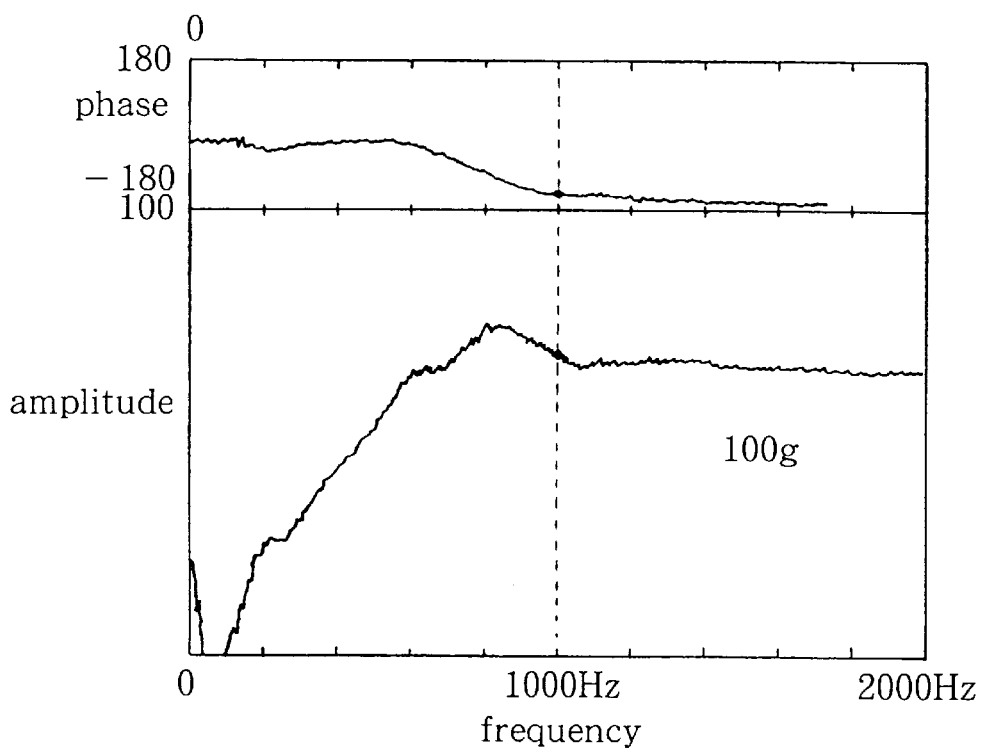

First of all, FIGS. 13(a) and 13(b) show the results of vibration tests with samples alone, i.e., before the aforementioned samples were glued to a brake shoe. FIG. 13(a) gives the results obtained with sample 1, while FIG. 13(b) gives the results obtained with sample 2. The test with samples alone was performed as follows. One each of sample 1 and sample 2 was glued separately to a large surface plate and a hammer used to create an impact in their vicinity. Pickups (acousto-electric transducers) were fitted to the samples and the surface plate, and their respective acoustic vibrations converted to electric signals. These electric signals were each amplified by a wideband amplifier, frequency analysis performed using a two-channel spectrum analyzer, and recordings made of the vibration amplitude of the weight and of the phase difference between the vibrations of the weight and the surface plate. In FIGS. 13(a) and 13(b), frequency is shown on the horizontal axis, while the amplitude and phase difference corresponding to a given frequency are shown on the vertical axis. The vibration amplitude is plotted on a logarithmic scale and is a relative value. The units of phase difference are degrees.

Looking at the test results given in FIGS. 13(a) and 13(b), it will be seen that in FIG. 13(a) the vibration of the weight has a large amplitude in the vicinity of 1000 Hz, and that the amplitude gradually decreases at higher frequencies than this. It will also be seen that although the phase difference between the vibration applied to the surface plate and the vibration of the weight is approximately zero in the lower frequency regime, there is a phase lag corresponding to an amplitude peak in the vicinity of 200 Hz. It will further be seen that the phase difference gradually increases with increasing frequency, becoming nearly −180 degrees when the vibration frequency exceeds 1000 Hz. In other words, the vibration of the weight becomes opposite in phase to the vibration applied to the surface plate. This test result shows that the vibration of the weight suppresses the applied vibration. In FIG. 13(b), because the mass of the weight is smaller, the frequency at which the amplitude is large is somewhat lower and the frequency at which the vibration of the weight becomes opposite in phase to that of the surface plate also becomes lower.

Test results of this sort show that if a part such as sample 1 or sample 2 is fitted to a brake shoe, the vibration of the weight will become opposite in phase at frequencies above 1000 Hz or 800 Hz, and that the vibration of the weight will act so as to suppress the vibration of the brake shoe.

(Test 2-2)

Next, the results of tests on brake shoes will be explained.

Figure 14:
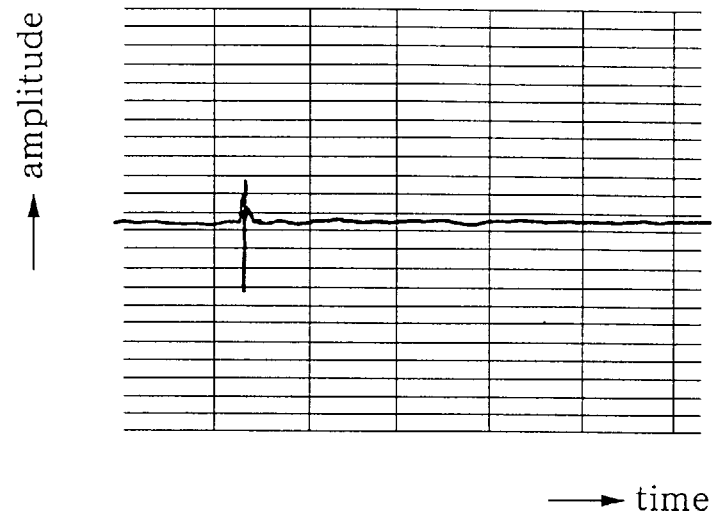
FIGS. 14(a) and (b) show the results of hammer blow tests in the case of this second embodiment of the invention and in a prior art case, respectively.
Figure 14:
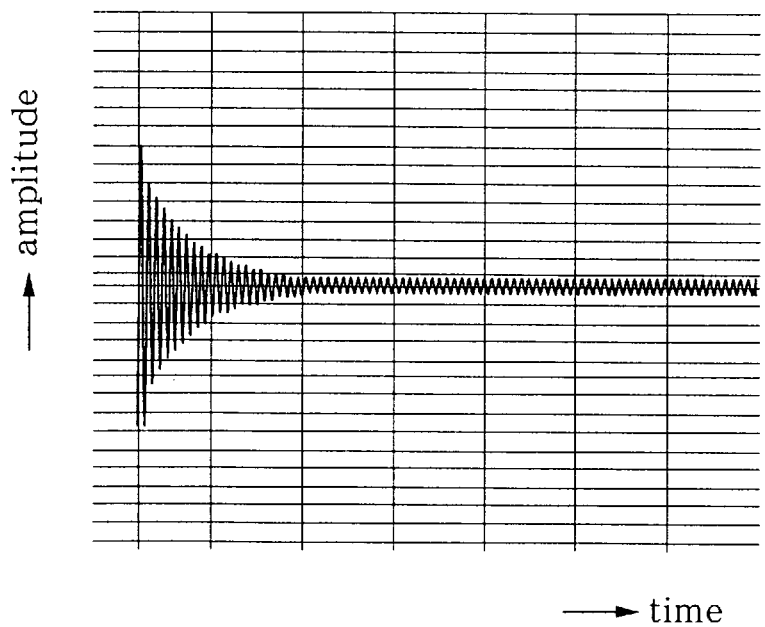

The tests were performed on brake shoes to which the samples described above had been fitted in the manner shown in FIG. 9 to FIG. 11. The results of these tests are shown in FIGS. 14(a) and 14(b), which is a recording of the vibration amplitude damping obtained when a brake shoe was placed on top of a sponge and hit once with a hammer. That is to say, a pickup was fitted to the brake shoe, the vibration converted to an electric signal, and this electric signal amplified by a wideband amplifier and then observed using an oscilloscope. In FIGS. 14(a) and 14(b), the horizontal axis shows time and the vertical axis shows the relative value of the amplitude.

FIG. 14(a) gives the test results for the second embodiment of this invention (see FIG. 11), while FIG. 14(b) is a comparison. This comparison gives the results of tests in which similar measurements were made after the samples had been removed from a brake shoe according to this second embodiment. FIGS. 14(a) and 14(b) shows that with this embodiment of the invention, vibration does not persist after the application of the hammer blow, and that it is immediately absorbed and damped. In other words, it is seen that the vibration of a brake shoe is effectively damped by means of this invention. The acoustic responses shown in FIG. 14(a) and FIG. 14(b) will also be clearly distinguishable by ear.

(Test 2-3)

Next, a test performed on a practical vehicle will be explained with reference to FIGS. 15(a) and 15(b).

One weight with a mass of 300 g, two weights each with a mass of 200 g, and one weight with a mass of 100 g were fixed, each with an intervening elastic body, to a brake shoe in the manner shown in FIG. 11, said brake shoe being mounted on a vehicle. The test was carried out with this vehicle parked on level ground. Once the brakes had been applied, a pickup was fitted to a brake drum so that any acoustic signal would be converted to an electric signal. An amplifier was used to amplify the resulting electric signal and a sampling oscilloscope employed to observe it. FIGS. 15(a) and 15(b) show recordings of the vibration damping waveform after the brake drun had been hit once with a hammer.

Figure 15:
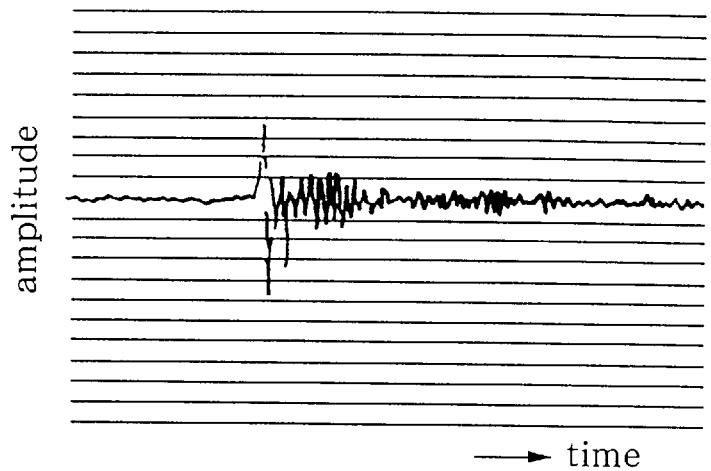
FIGS. 15(a) and (b) show the results of hammer blow tests in the case of this second embodiment of the invention and in a prior art case, respectively.
Figure 15:
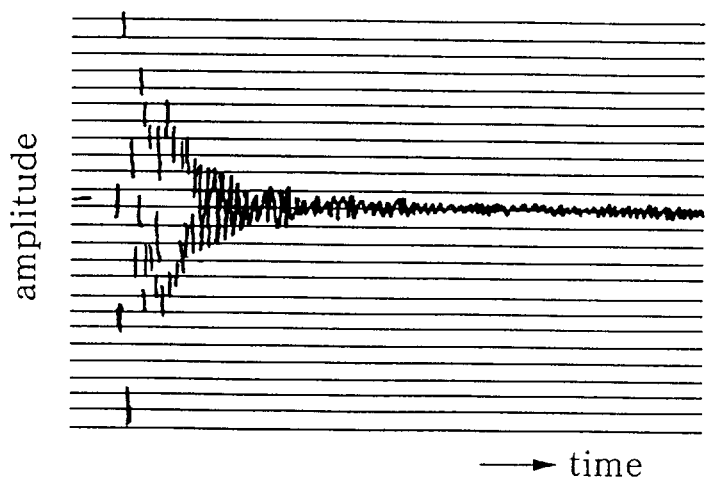

When neither weights nor elastic bodies were fitted, a large-amplitude vibration and its reverberations were generated, as shown in FIG. 15(b). When the weights and elastic bodies were fitted, it will be seen that the amplitude was smaller and that vibration during braking was damped, as shown in FIG. 15(a).

(Test 2-4)

Next, a running test was performed on the aforementioned practical vehicle. All the weights and elastic bodies pertaining to the second embodiment of this invention were removed and the vehicle was run. When the brakes were applied, a loud noise was produced. It was then confirmed that when the measures described above were taken, no noise was produced at all. This was confirmed for a variety of running and brake conditions. It was also confirmed that if the weights and elastic bodies were again removed, brake noise occurred again.

As will be seen from these test results, by having weights 5b fitted by way of elastic bodies 4b, vibration generated during braking is damped and the occurrence of brake noise is sufficiently reduced for practical purposes.

The aforementioned second embodiment was explained in terms of fixing the weights and elastic bodies by means of an adhesive. Although fixing using an adhesive gives sufficient strength for practical purposes, a mechanical fixing part can be used to make the fitting still more secure. A bolt or pin may be used as a fixing part, and this can be passed through weight 5b, elastic body 4b and rim 3. In this case, a concavity should be provided in the surface of the brake lining in the vicinity of the region where the fixing part is used (this concavity corresponds to concavity 13 in FIG. 19).

(Third embodiment)

Figure 16:
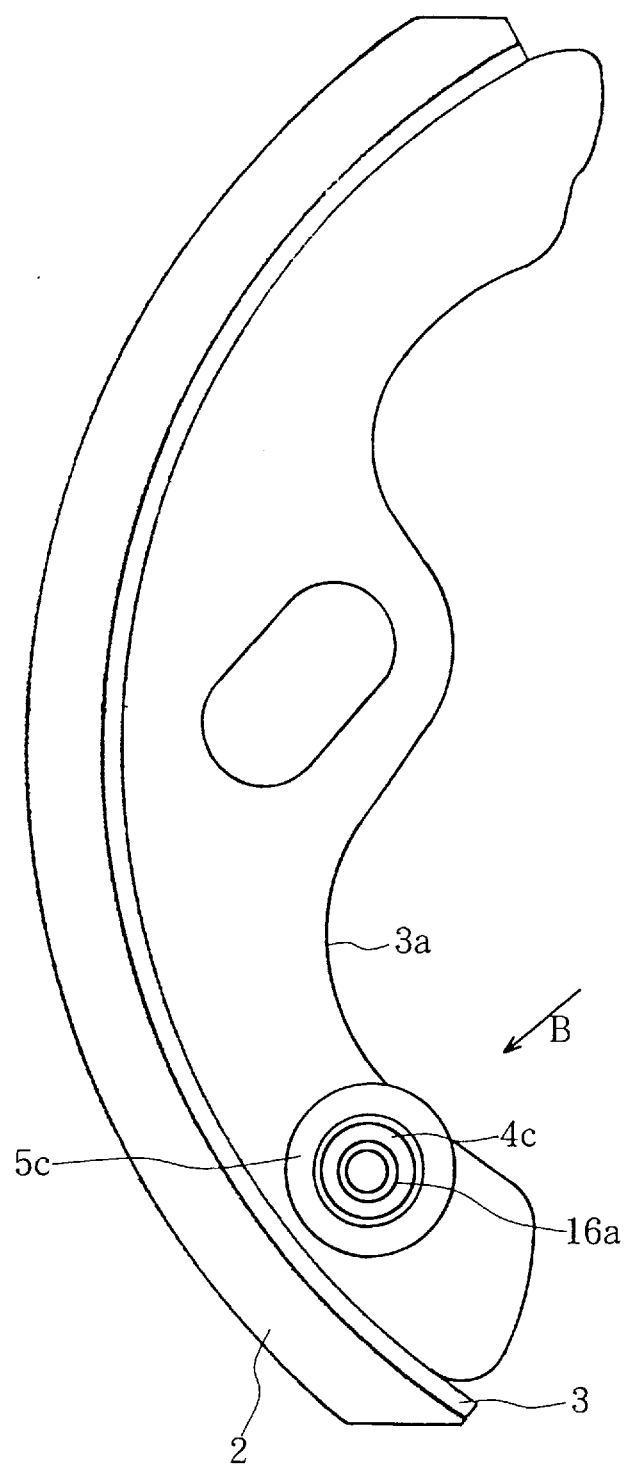
FIG. 16 is a partially side view showing the configuration of a third embodiment of this invention.
Figure 17:
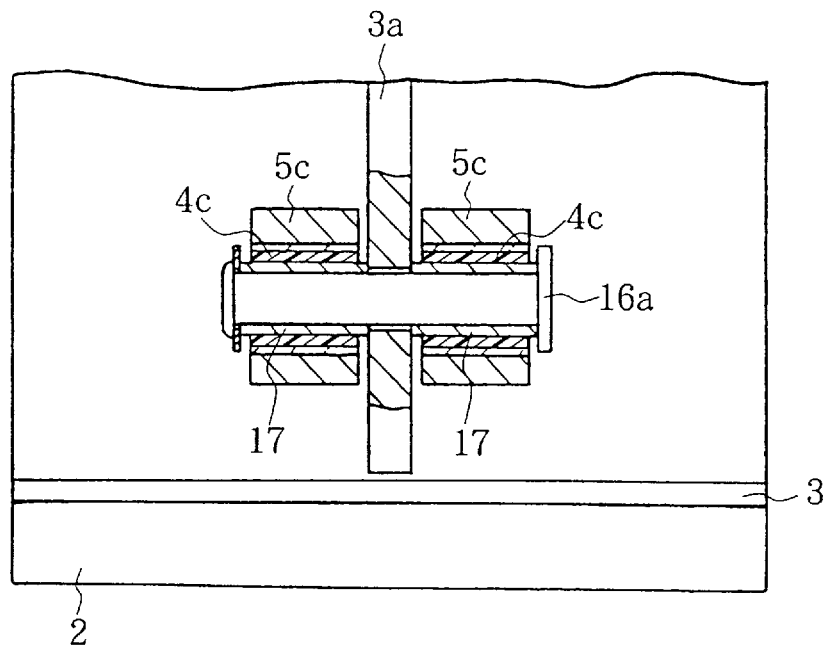
FIG. 17 is a partial sectional view, looking in the direction of arrow B shown in FIG. 16, of the case where a weight and an elastic body have been fitted to both sides of the web in this third embodiment of the invention.
Figure 18:
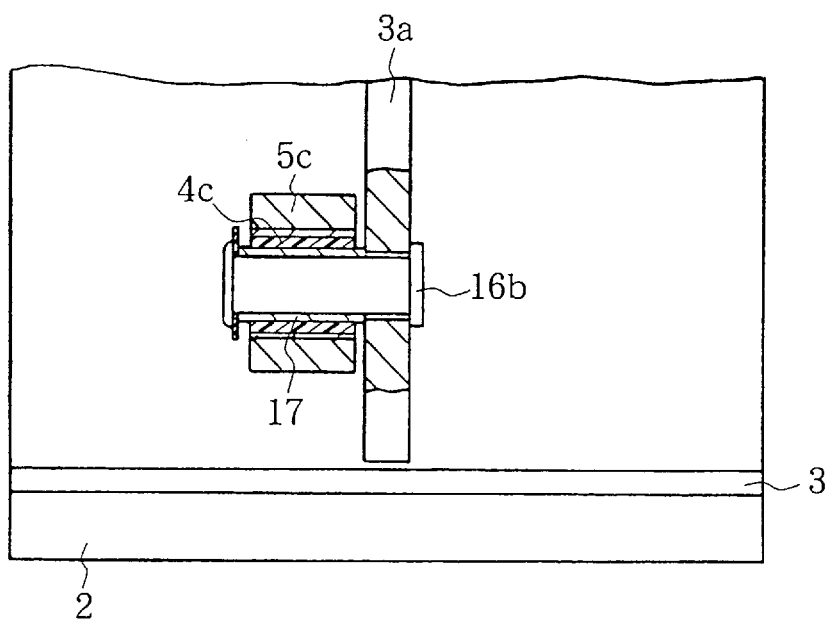
FIG. 18 is a partial sectional view, looking in the direction of arrow B shown in FIG. 16, of the case where a weight and an elastic body have been fitted to one side of the web in this third embodiment of the invention.

FIG. 16 is a partial side view showing the configuration of a third embodiment of this invention. FIG. 17 is a partial sectional view, looking in the direction of arrow B shown in FIG. 16, of the case where a weight and an elastic body have been fitted to both sides of the web in this third embodiment of the invention. FIG. 18 is a partial sectional view, looking in the direction of arrow B shown in FIG. 16, of the case where a weight and an elastic body have been fitted to one side of the web in this third embodiment of the invention.

In this third embodiment of the invention, a through-hole is provided in web 3a, bush 17 is inserted over pin 16a or 16b which have been inserted in this through-hole, and elastic body 4c is anchored to the outer periphery of this bush 17, said elastic body 4c being contained within ring-shaped weight 5c. Elastic body 4c and weight 5c are positioned on both sides of web 3a as shown in FIG. 17, or on one side of web 3a as shown in FIG. 18, and are fixed by caulking one end of pins 16a and 16b. Spaces are provided at both sides of weights 5c and elastic bodies 4c so that they do not come into contact with the sides of web 3a and the ends of pin 16a and pin 16b as a result of vibration.

This configuration provides a simple and secure way of fitting the weights and the elastic bodies, and in practical terms is a superior configuration. It has been verified that brake noise is reduced by this configuration as well.

(Fourth embodiment)

Figure 19:
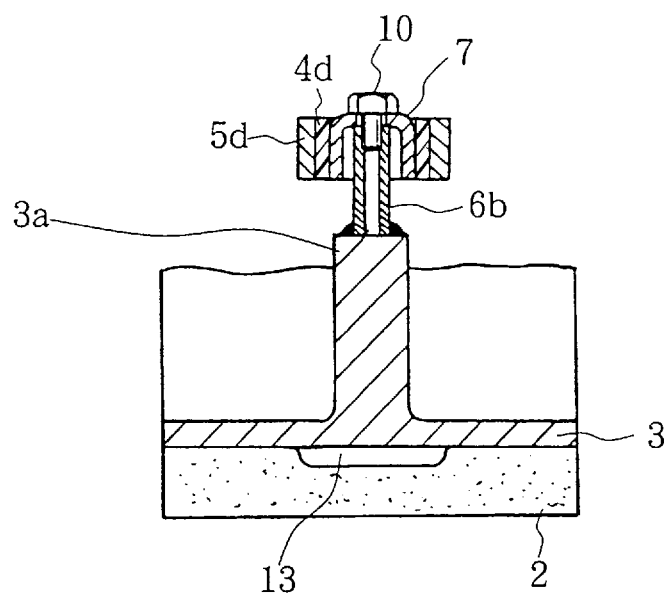
FIG. 19 is a sectional view in the circumferential direction of a brake shoe, and shows the configuration of a fourth embodiment of this invention.

FIG. 19 is a sectional view in the circumferential direction of a brake shoe, and shows the configuration of a fourth embodiment of this invention.

In this fourth embodiment of the invention, rod 6b is provided upright on the top of web 3a, and concavity 13 is provided at a position on brake lining 2 corresponding to rod 6b. A support 7 attached to rod 6b via bolt 10 supports elastic body 4d and weight 5d. This fourth embodiment is likewise capable of damping the vibration that results from deformation of rim 3 produced during braking, and of reducing brake noise in similar manner to the embodiments described above.

(Fifth embodiment)

Figure 20:
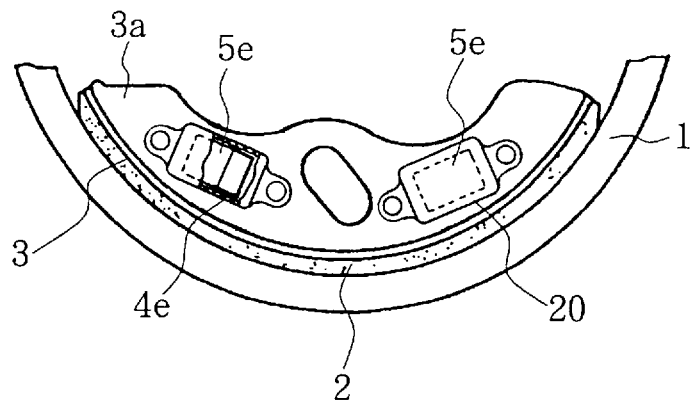
FIG. 20 is a partial side view showing the configuration of a fifth embodiment of this invention.
Figure 21:
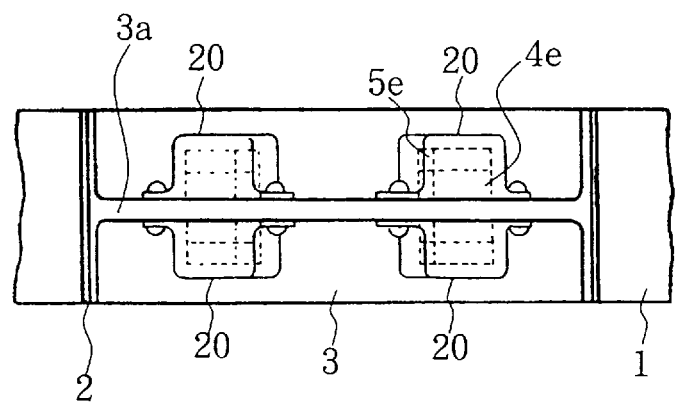
FIG. 21 is a partial plan view showing the configuration of this fifth embodiment of the invention.

FIG. 20 is a partial side view showing the configuration of a fifth embodiment of this invention. FIG. 21 is a partial plan view showing the configuration of said fifth embodiment.

In this fifth embodiment of the invention, a plurality of weights 5e are fitted, by means of adhesion and by way of respective elastic bodies 4e, to both sides of web 3a which supports rim 3, on which brake lining 2 has been fitted, the brake lining 2 being pressed against brake drum 1 and generating braking force by means of frictional resistance. Tightly closed covers 20 are provided around these elastic bodies 4e and weights 5e, with sufficient space left for free vibration. These covers 20 ensure that wear powder produced by wear of the brake lining is not deposited directly on these weights 5e and elastic bodies 4e, and does not cause their mass or elastic characteristics to change.

(Sixth embodiment)

Figure 22:
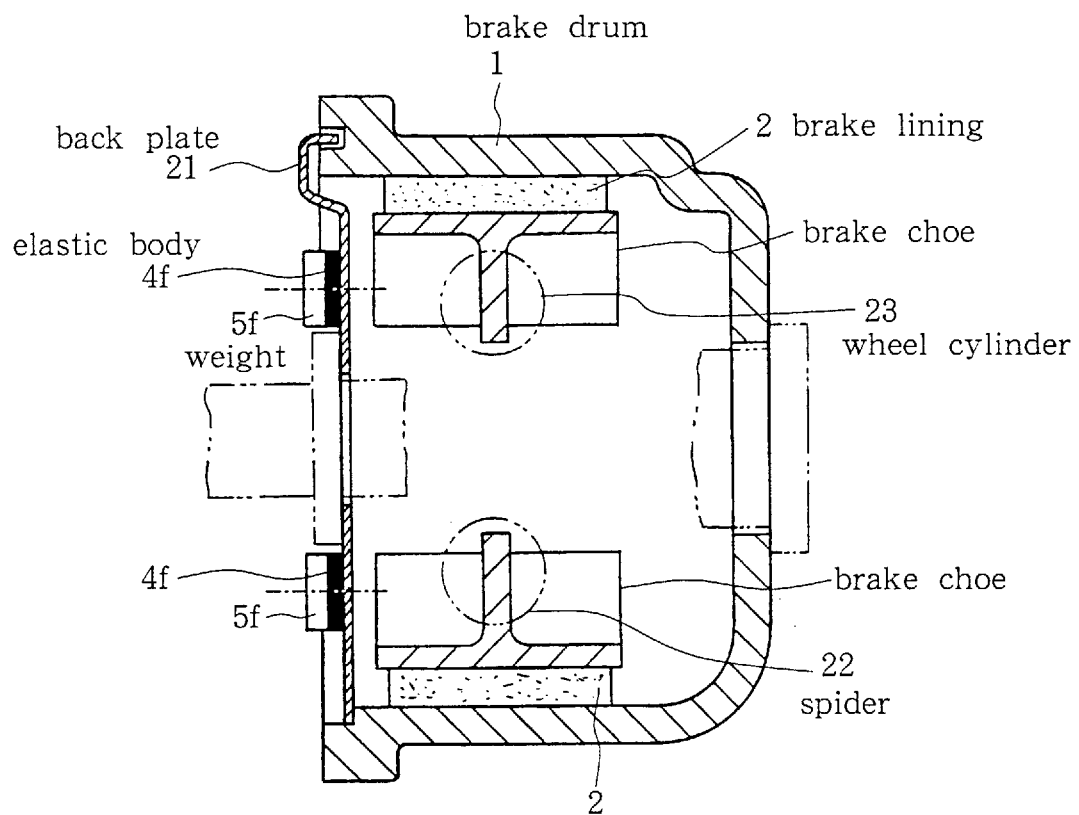
FIG. 22 is a sectional view of a drum brake showing the configuration of the main parts of a sixth embodiment of this invention.

FIG. 22 is a sectional view of a drum brake, and shows the configuration of the main parts of a sixth embodiment of this invention.

In this sixth embodiment of the invention, weights 5f are fitted by way of elastic bodies 4f to the surface of back plate 21. This sixth embodiment of the invention prevents resonance of back plate 21 due to vibrations generated during braking, and this also enables brake noise to be suppressed in similar manner to the embodiments described above. In the configuration shown in FIG. 22, elastic bodies 4f are glued to back plate 21. However, weights 5f and elastic bodies 4f can be securely prevented from coming off by the use of rods or bolts in the positions shown by the alternate dash and dot lines in FIG. 22.

(Test 3)

Figure 23:
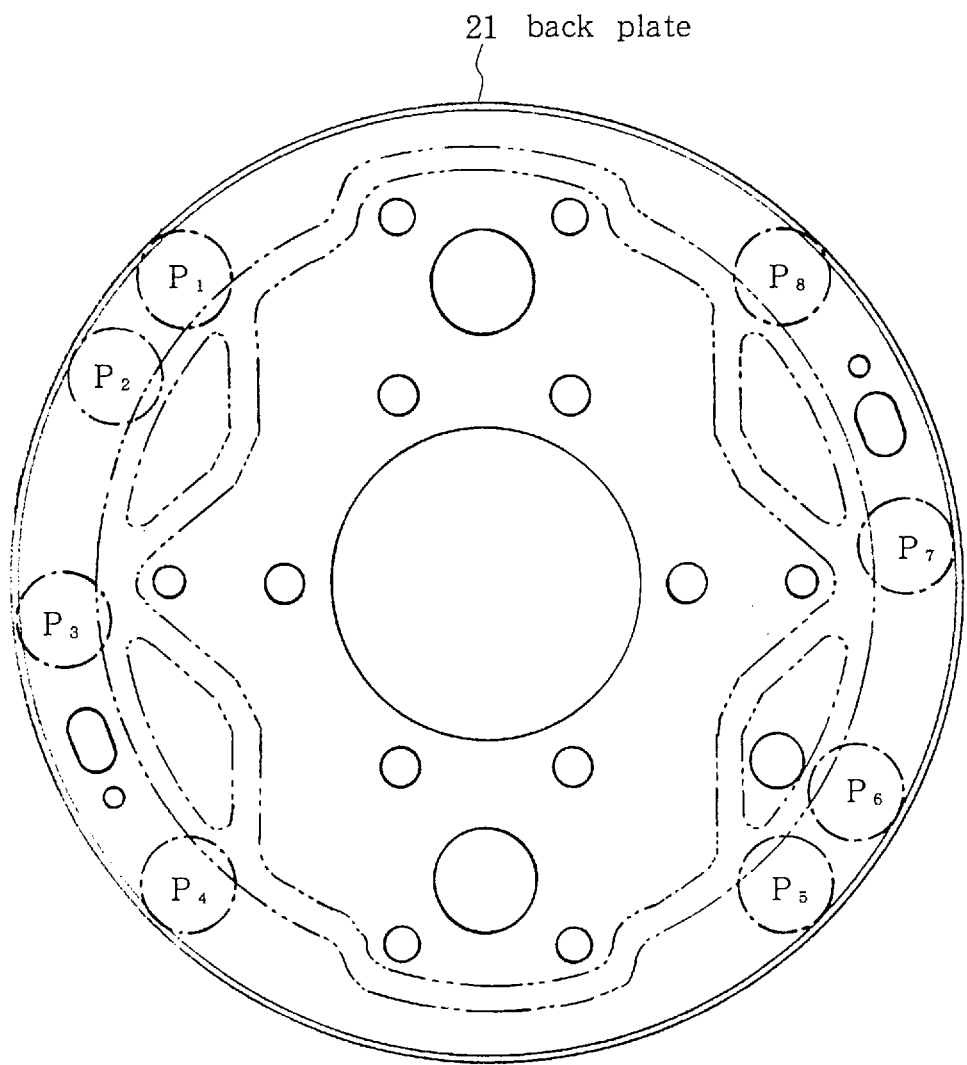
FIG. 23 serves to explain experimental samples according to this sixth embodiment of the invention.

Weights 5f were fitted by way of elastic bodies 4f at eight places referenced P1–P8 on the surface of back plate 21 (see FIG. 23), and this assembly was fitted to a small bus which had produced brake noise. A vehicle running test was then performed. This demonstrated that brake noise which had been approximately 120 dB(A) at a position 1 m from the brake was reduced to less than 80 dB(A), which for practical purposes is not a level that raises concern.

Figure 24:
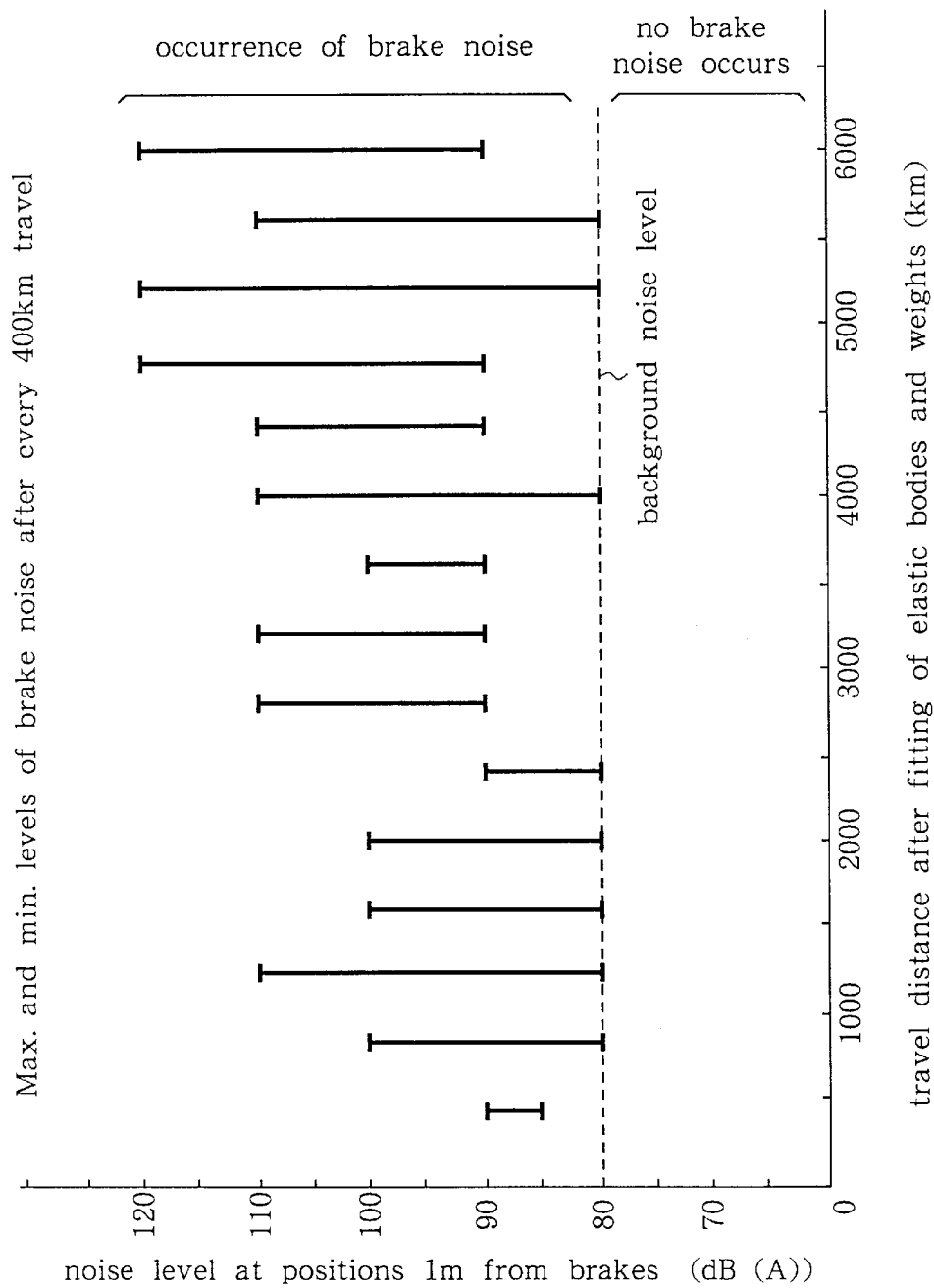
FIG. 24 shows noise level during braking at various travel distances with this sixth embodiment of the invention.

FIG. 24 shows recorded noise levels during braking at various travel distances with this sixth embodiment of the invention. To obtain this data, new brakes were fitted to a medium-sized bus. When this had been run for about 500 km and brake noise was being produced, eight weights 5f were fitted by way of elastic bodies 4f as described above to back plate 21 of one wheel. Running tests of approximately 400 km were then performed repeatedly. Generation of brake noise from wheels at both sides of the vehicle was observed during these running tests by installing microphones 1 m behind the wheels on both sides of the vehicle, and fitting vibration acceleration pickups to back plates 21. As shown in FIG. 24, it was found that brake noise with a maximum value of 120 dB occurred at the wheels to which elastic bodies 4f and weights 5f had not been fitted, whereas no brake noise occurred at the wheel to which these had been fitted, since at this wheel the background noise level of 80 dB was never exceeded.

Figure 25:
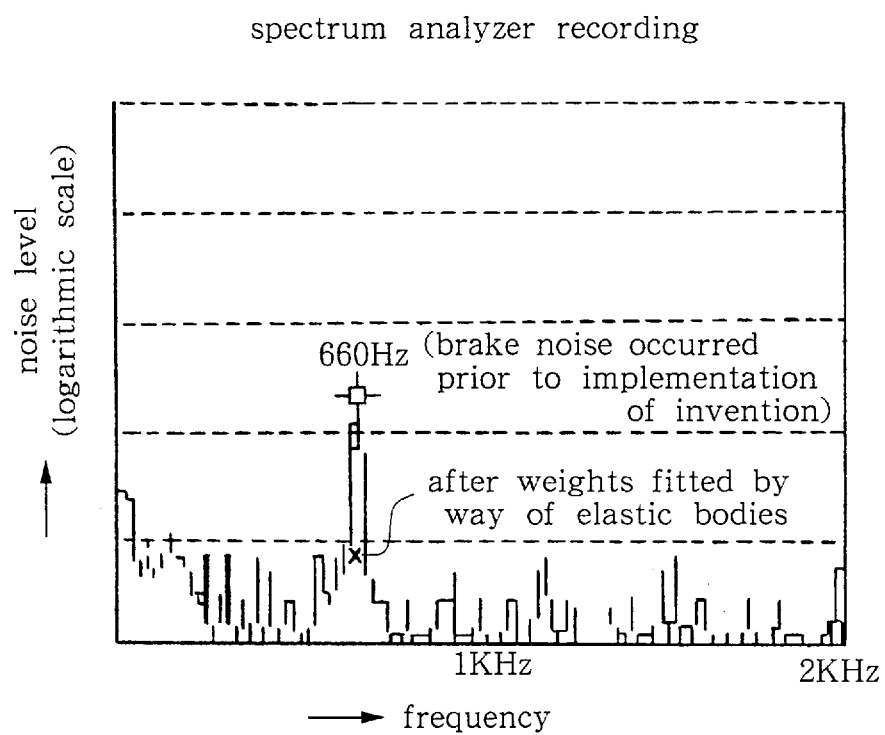
FIG. 25 shows an actual recording of noise level during braking as a function of frequency in this sixth embodiment of the invention.

FIG. 25 gives measurements of brake noise in this sixth embodiment of the invention, these measurements having been obtained with a spectrum analyzer of a simple type capable of being carried on a vehicle. The horizontal axis gives frequency and the vertical axis shows noise level on a logarithmic scale. Prior to implementation of this invention, brake noise was observed at a frequency of 660 Hz, but by fitting weights 5f by way of elastic bodies 4f to back plate 21, the brake noise level dropped to the position shown by the x symbol in FIG. 25, indicating that the occurrence of brake noise was suppressed. This was clearly observed by ear as well.

As has been explained above, the present invention can reduce, in an optimally effective way and simply by adding inexpensive parts, brake noise generated during braking of a motor vehicle. It is particularly effective when applied to a large-sized vehicle with large brake shoes 8, and it can maintain this reduction of brake noise without change in performance when the brake lining is replaced.

Moreover, because the elastic body and the weight are enclosed by means of a cover, wear powder generated from the brake lining during braking can be prevented from accumulating around said elastic body and weight, with the result that it is possible to suppress the deterioration of the elastic body and the adhesive, and to suppress the loss of the cushioning function of the elastic body. Reliability can thereby be further improved.

(Seventh embodiment)

Figure 26:
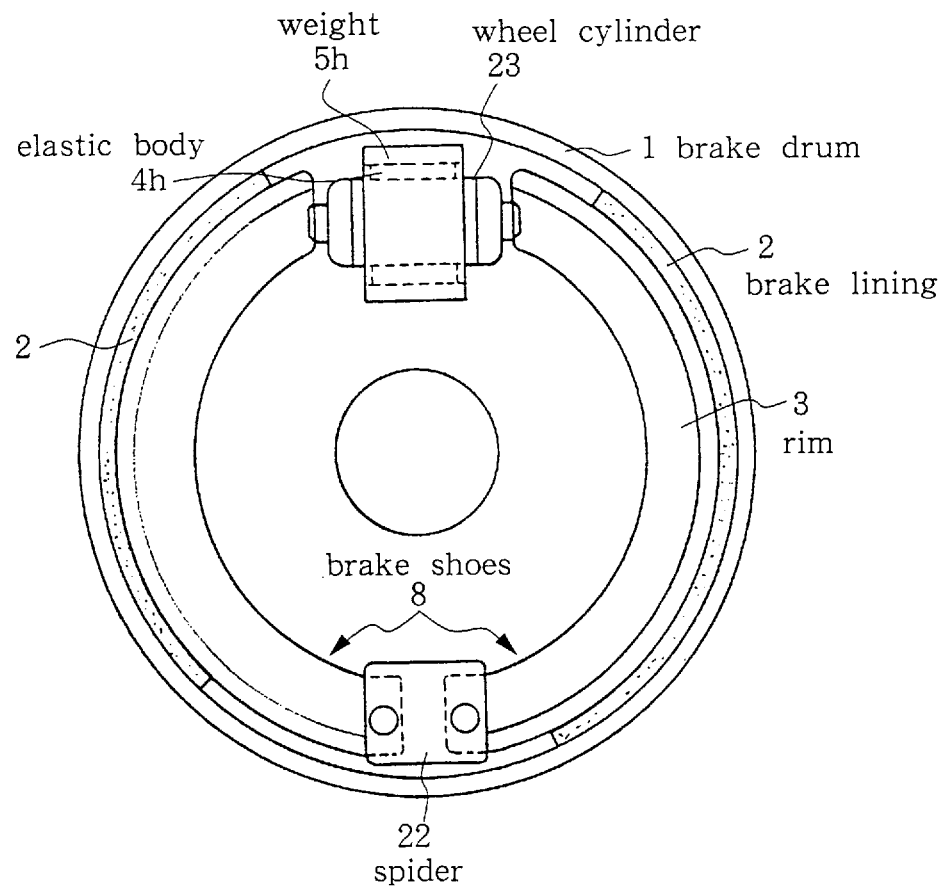
FIG. 26 is a front view of the inside of a drum brake showing the configuration of a seventh embodiment of this invention.
Figure 27:
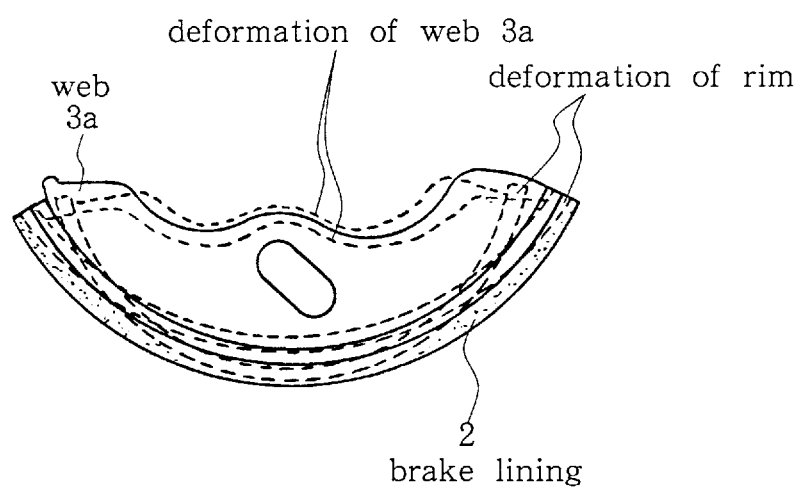
FIG. 27 clarifies the nature of brake shoe deformation when brake noise is generated during braking.

FIG. 26 is a front view of the inside of a drum brake showing the configuration of a seventh embodiment of this invention. This seventh embodiment of the invention has: brake drum 1; brake lining 2 which is pressed against the inside of this brake drum 1 and which applies a braking force by means of friction; a pair of brake shoes 8 to the outer periphery of which this brake lining 2 has been fitted; spider 22 which supports one end of each of these brake shoes 8 so that they can rotate freely; wheel cylinder 23 which applies a pushing pressure to the other end of each brake shoe 8; and a back plate (not illustrated) which supports wheel cylinder 23 and spider 22, and which covers the opening of brake drum 1. Weight 5h is fitted by way of elastic body 4h to the outside of wheel cylinder 23. In the case of this seventh embodiment as well, letting the mass of weight 5h be m and the spring constant of elastic body 4h be k, the natural vibration frequency of weight 5h fitted by way of elastic body 4h will be given by:

$$f_0 = (1/(2\pi))\sqrt{(k/m)}$$

and is set so as to be lower than the brake noise frequency $f_s$ produced by brake lining 2.

In this seventh embodiment as well, by having weight 5h fitted to wheel cylinder 23 by way of elastic body 4h, vibration generated during braking is damped and the occurrence of brake noise is sufficiently reduced for practical purposes. Moreover, because elastic body 4h and weight 5h are fitted to wheel cylinder 23 which is not directly exposed to generated heat, early deterioration of elastic body 4h and adhesive is suppressed.

We claim:

1. A brake shoe comprising:

a web;

a rim connected to said web, said rim having a first surface and a second surface;

a brake lining coupled to said first surface of said rim;

a weight coupled to said rim at said second surface; and an elastic body disposed between said weight and said second surface of said rim;

wherein the mass of said weight is m, the spring constant of said elastic body is k, and the natural vibrational frequency of said weight disposed with said elastic body is $$f_0 = (1/(2\pi))\sqrt{(k/m)}$$

and is set to be approximately equal to or less than the frequency $f_s$ of the brake noise generated by said brake shoe;

a rod is provided upright on said rim, and said weight is fitted to said rod by said elastic body;

a support is fitted to said rod;

a space is provided at least partially between said support and said rod;

said elastic body is provided in such manner as to enclose said support; and said weight is ring-shaped and is provided in such manner as to enclose said elastic body.

2. The brake shoe as set forth in claim 1, wherein the position at which said weight is coupled is the inside of said rim.

3. The brake shoe as set forth in claim 1, wherein said rod is cylindrical in shape.

4. The brake shoe as set forth in claim 1, wherein a concavity is formed in the surface of said brake lining where it couples with said rim, and in the vicinity of the position where said weight is coupled.

5. The brake shoe as set forth in claim 1, wherein a cover is placed over said weight and said elastic body.

6. A drum brake which has a brake shoe, said brake shoe comprising:

a web;

a rim connected to said web, said rim having a first surface and a second surface;

a brake lining coupled to said first surface of said rim;

a weight coupled to said rim at said second surface; and an elastic body disposed between said weight and said second surface of said rim;

wherein the mass of said weight is m, the spring constant of said elastic body is k, and the natural vibrational frequency of said weight disposed with said elastic body is $$f_0 = (1/(2\pi))\sqrt{(k/m)}$$

and is set to be approximately equal to or less than the frequency $f_s$ of the brake noise generated by said brake shoe;

a rod is provided upright on said rim, and said weight is fitted to said rod by said elastic body;

a support is fitted to said rod;

a space is provided at least partially between said support and said rod;

said elastic body is provided in such manner as to enclose said support; and said weight is ring-shaped and is provided in such manner as to enclose said elastic body.

* * * * *